United States Patent [19]

Marc

[11] 4,193,324
[45] Mar. 18, 1980

[54] BICYCLE SPROCKET DRIVE APPARATUS WITH ELLIPTICAL PEDAL PATH

[75] Inventor: Michel Marc, Wellesley, Mass.

[73] Assignee: Clint, Inc., Natick, Mass.

[21] Appl. No.: 864,278

[22] Filed: Dec. 27, 1977

[51] Int. Cl.² ............... F16H 1/28; B62M 3/06; B62M 1/02

[52] U.S. Cl. .................. 74/750 B; 74/803; 74/594.2; 74/437; 280/260

[58] Field of Search ............. 74/217 B, 243 R, 228, 74/803, 750 B, 750 R, 594.2, 437; 280/236, 259, 260, 261

[56] References Cited

U.S. PATENT DOCUMENTS

| 158,035 | 12/1874 | Cliff | 74/803 |
|---|---|---|---|
| 514,888 | 2/1894 | Gleason | 74/803 |
| 1,432,090 | 10/1922 | Simpson | 74/803 |
| 3,259,398 | 7/1966 | Hattan | 280/261 |

FOREIGN PATENT DOCUMENTS

| 890907 | 9/1953 | Fed. Rep. of Germany | 74/750 B |
|---|---|---|---|
| 2264709 | 10/1975 | France | 280/261 |
| 7442984 | 7/1976 | France | 280/259 |
| 409654 | 2/1945 | Italy | 74/243 R |

*Primary Examiner*—Benjamin Wyche
*Assistant Examiner*—David C. Reichard
*Attorney, Agent, or Firm*—Wolf, Greenfield & Sacks

[57] ABSTRACT

An improved-efficiency, pedal-operated drive mechanism for a bicycle employing an elliptical sprocket used in association with a planetary-type gear drive for providing an elliptical path of travel of the bicycle pedals. The gear arrangement is disposed in a circular frame mounted from the conventional bicycle frame having secured therein, in a stationary position, an internally-toothed ring gear. The planetary-type drive also includes a pair of rotatable pinion gears diametrically meshed with the ring gear and supported in a bearing housing within the frame on respective pedal axles which are each secured to a pedal arm. The motion of the pedals is along an elliptical locus as the pinion gears individually but synchronously rotate in the fixed ring gear. The sprocket which is preferably of elliptical shape is secured to the housing and rotates therewith driving the bicycle with an improved efficiency on the order of 25 percent or more in comparison to the conventional circular drive system.

9 Claims, 5 Drawing Figures

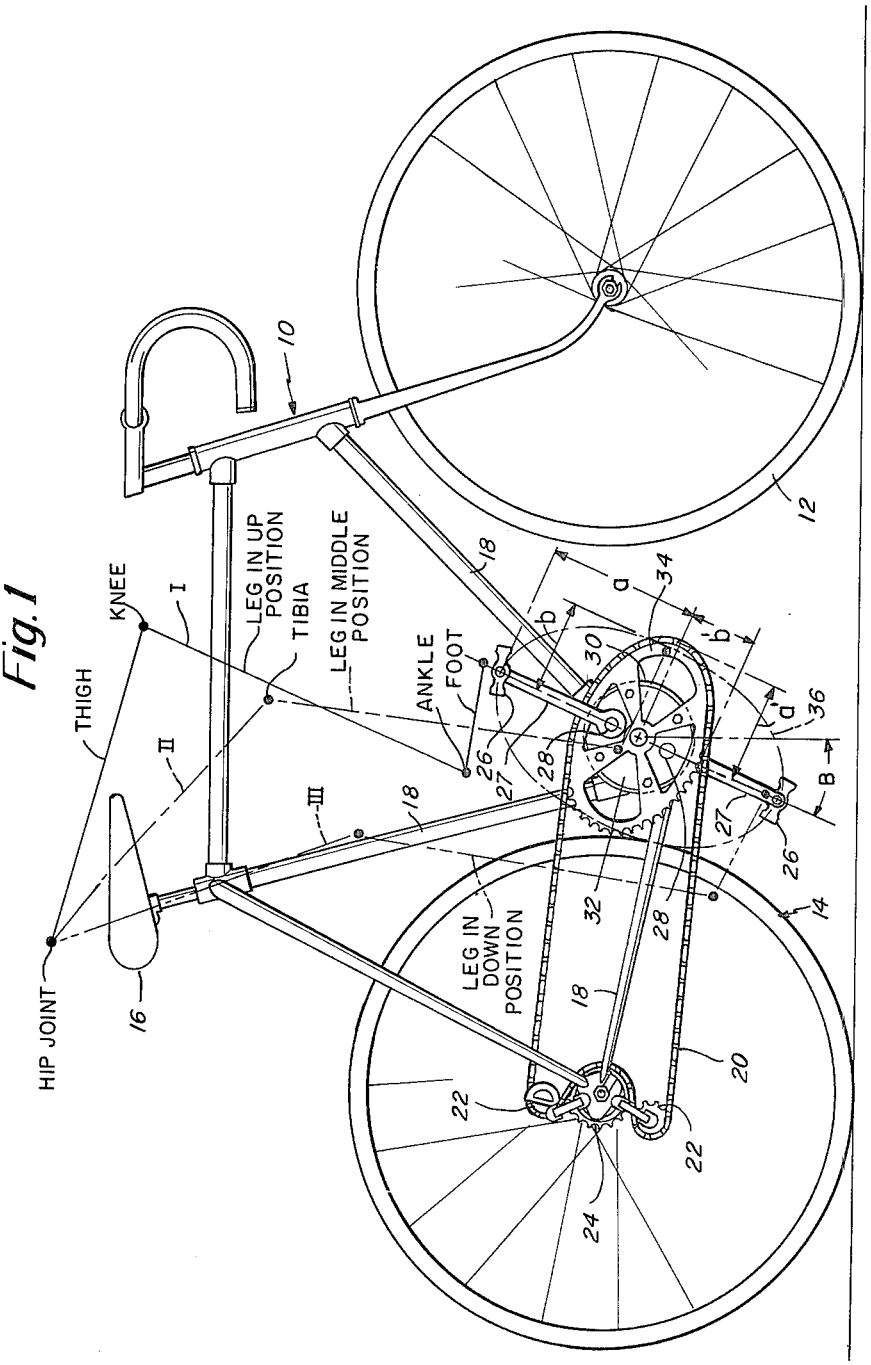

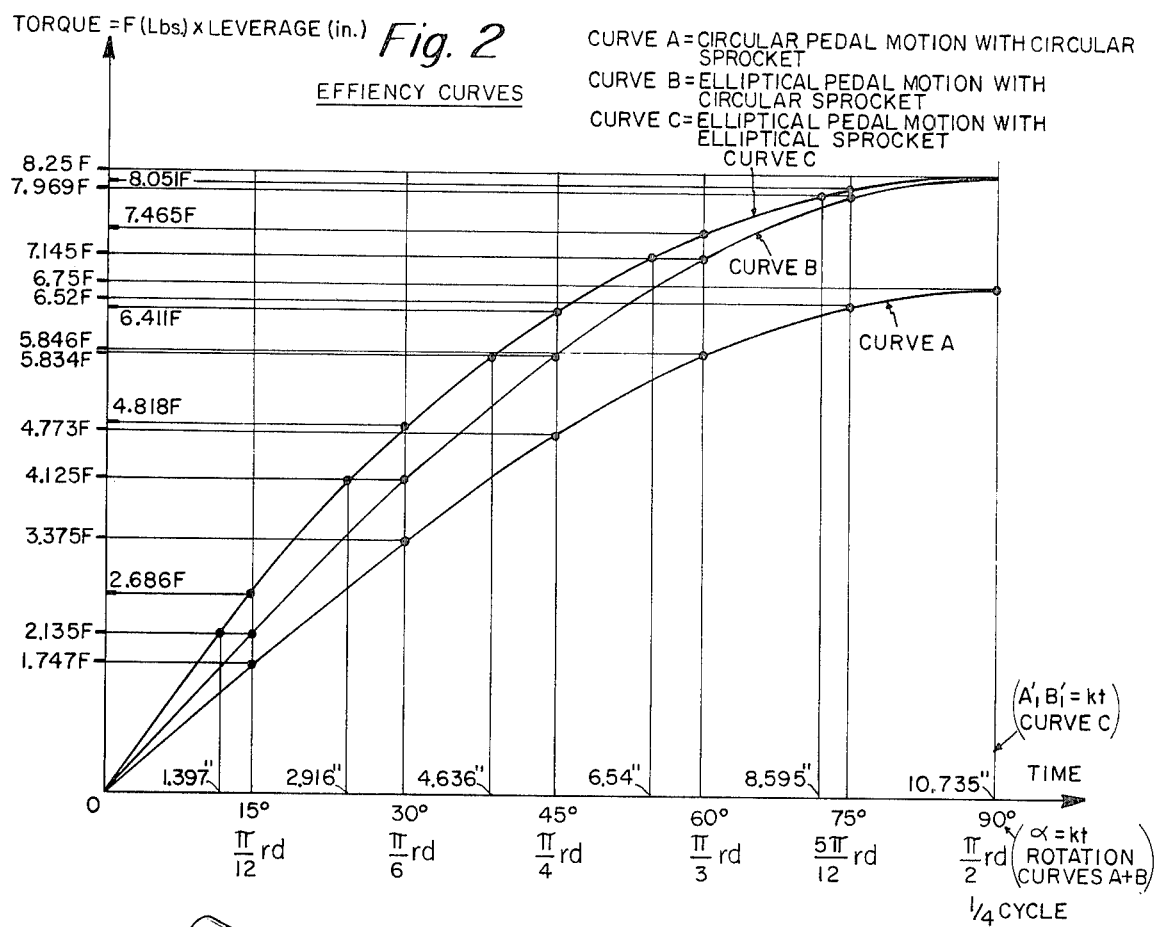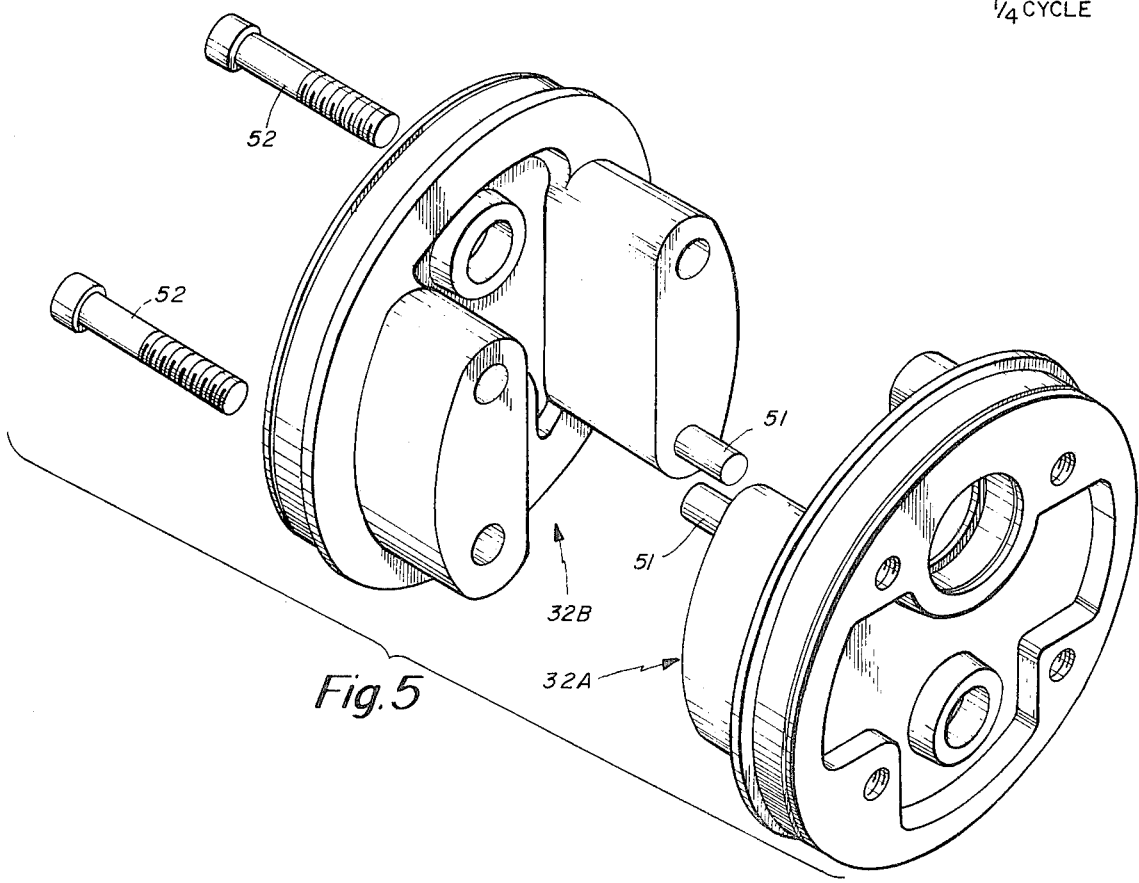

BICYCLE SPROCKET DRIVE APPARATUS WITH ELLIPTICAL PEDAL PATH

INTRODUCTION

The present invention pertains in general to an improved sprocket drive apparatus which in the disclosed embodiment is used for propelling a bicycle; it being understood that the principles of the invention may also be used in different other types of gear drive mechanisms. The invention relates more particularly to a planetary gear drive that provides an elliptical path of travel of the bicycle pedal. Preferably, in association with this elliptical path of travel there is also provided an elliptical sprocket coupled to a chain to drive the rear wheel of the bicycle.

A circular sprocket is used on a conventional bicycle and is typically provided with 52 teeth, each having a 0.5 inch pitch. With the use of a circular sprocket and a pedal assembly having a fixed axis of rotation, there is a limitation on the efficiency that can be obtained with the conventional bicycle structure.

Accordingly, in accordance with the invention, an improved drive system has been devised for providing an improved efficiency of operation in comparison with the conventional drive system for a bicycle. The apparatus of this invention includes a planetary gear drive which in turn provides an elliptical path of travel of the bicycle pedals thereby improving the efficiency by a factor on the order of 20%. Furthermore, in accordance with the invention an elliptical sprocket is used in association with the planetary gear drive so as to enable a constant speed of operation. With the invention the eccentricity of the sprocket is matched to the eccentricity of the elliptical path of the pedals.

One object of the present invention is thus to provide a bicycle sprocket drive apparatus characterized by an improved efficiency of operation.

Another object of the present invention is to provide a drive apparatus in accordance with the preceding object without adding any appreciable weight to the bicycle, and without adding substantially to the friction of the drive system.

SUMMARY OF THE INVENTION

To accomplish the foregoing and other objects of this invention there is provided a bicycle sprocket drive apparatus of improved efficiency and which is mounted on a bicycle frame for the purpose of propelling the bicycle. The drive apparatus comprises a frame means which is preferably a bicycle frame tube and two-piece outer securing ring. The drive includes a planetary gear means and a housing means for mounting the planetary gear means with portions of the planetary gear means rotatable and other portions fixed. The planetary gear means includes an internally geared ring gear which is fixed in position in the frame means and a pair of pinion gears each separately, rotatably mounted in the housing means and having axle means for the support thereof extending from opposite sides of the housing and each for supporting a pedal means. The pedal means may comprise a conventional pedal arm and associated pedal. The housing means is meant to rotate in the frame means and for this purpose there is included first bearing means, for rotatably supporting the housing means in the frame means. There are also provided second bearing means including bearings for supporting each axle means in the housing means. The housing means is constructed so as to mount the pinion gears in meshing relationship with the ring gear and on diametrically opposite sides thereof. Although the pinion gears mesh with the ring gear they are spaced along the longitudinal axis of the housing means so that the pinion gears are not in mesh with each other. A sprocket is also provided which may be of circular construction but is preferably of elliptical construction. This sprocket is secured to the housing means preferably by a plurality of bolts with one of the pedal means extending therethrough but not interfering therewith.

In operation, when the pedals are operated, the associated pinion gears drive the housing means within the fixed frame means. The pinion gears are maintained disposed in a diametrical position continuously meshing on opposite sides of the ring gear. The sprocket which is secured to the driven housing means is thus in turn driven by operation of the pedals. With this planetary gear arrangement the path of the pedals follows the shape of an ellipse and it has been found that even with the use of a standard circular sprocket, the increase of efficiency with the elliptical drive path is on the order of at least 20%. When the elliptical sprocket is used in association with the elliptical pedal path, the motion of the elliptical pedal path is then at a constant speed and the increase in efficiency may be on the order of at least 25%.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a side elevational view of the drive system of this invention adapted to a conventional bicycle;

FIG. 2 is an efficiency curve associated with the apparatus of the invention;

FIG. 5 is an exploded perspective view showing a portion of the apparatus depicted in FIG. 4.

DETAILED DESCRIPTION

Figure 3:
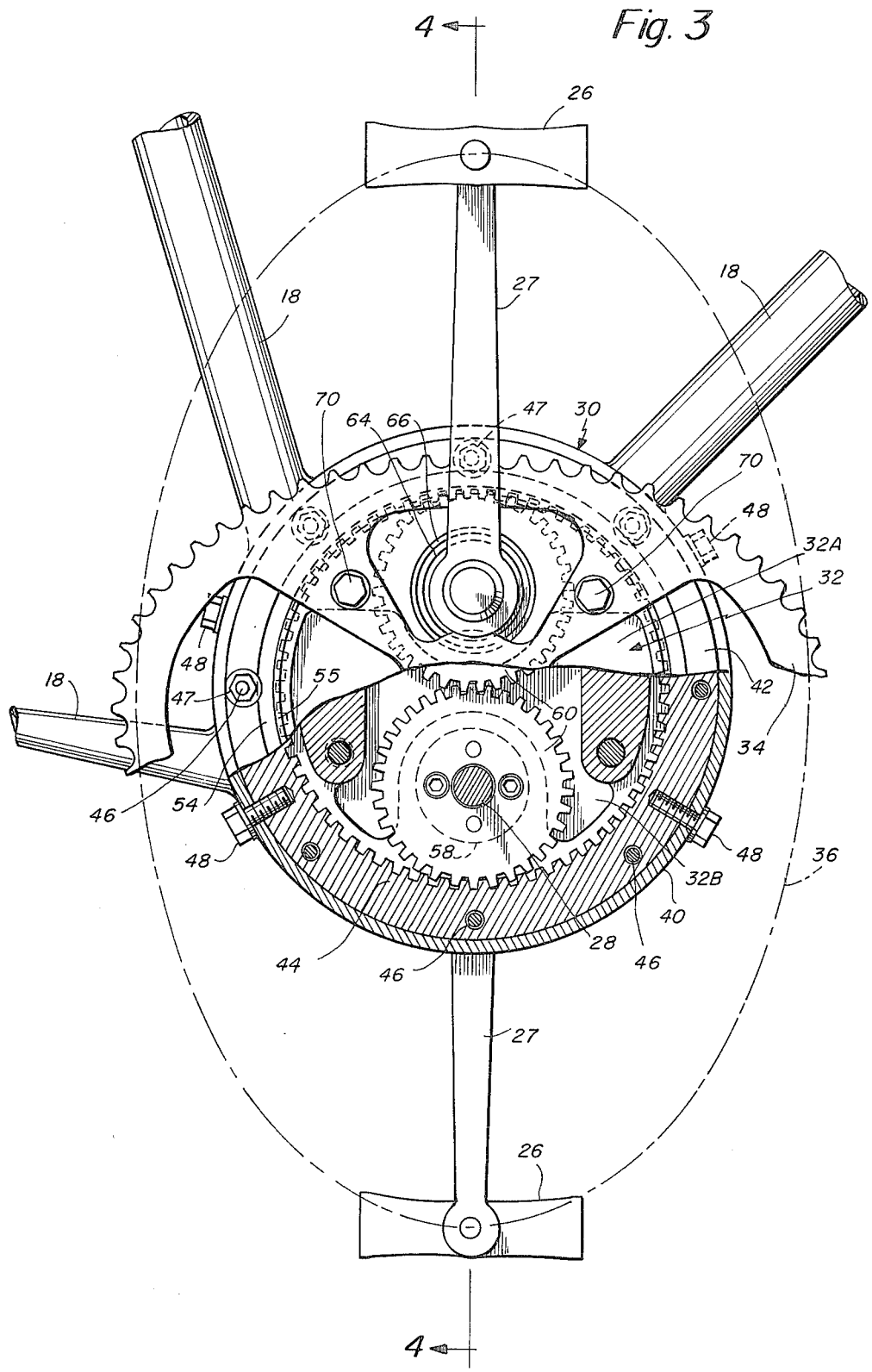
FIG. 3 is a more detailed side elevation view of the gear drive system of this invention.

FIG. 1 shows the drive system of the present invention used in association with a bicycle. However, it is to be understood that the drive concept of this invention may be used in many other applications where it is desired to transform a linear motion (back and forth) to a rotary motion. For example, the principle of operation may be applicable to an automobile engine wherein the pedals of the bicycle are analogous to the connecting rods of the engine and the sprocket is analogous to the crank shaft or portions thereof.

In the illustrative embodiment of FIG. 1 there is shown a bicycle comprising a frame 10, a front wheel 12, a rear wheel 14, and a seat 16. The basic construction of the wheels, seat and frame is conventional with the frame comprising a number of tubular sections including the three tubular sections 18 for supporting the drive system of this invention. The drive system of this invention may drive a conventional chain 20 which couples by means of Derailleur gears 22 to the rear drive sprocket 24.

FIG. 1 also shows in a schematic manner, the position of the operator of the bicycle. One position is shown in solid and this is referred to as position I with the leg in an up position. FIG. 1 also shows positions I and III with the leg respectively in a middle position and in a down position.

Figure 4:
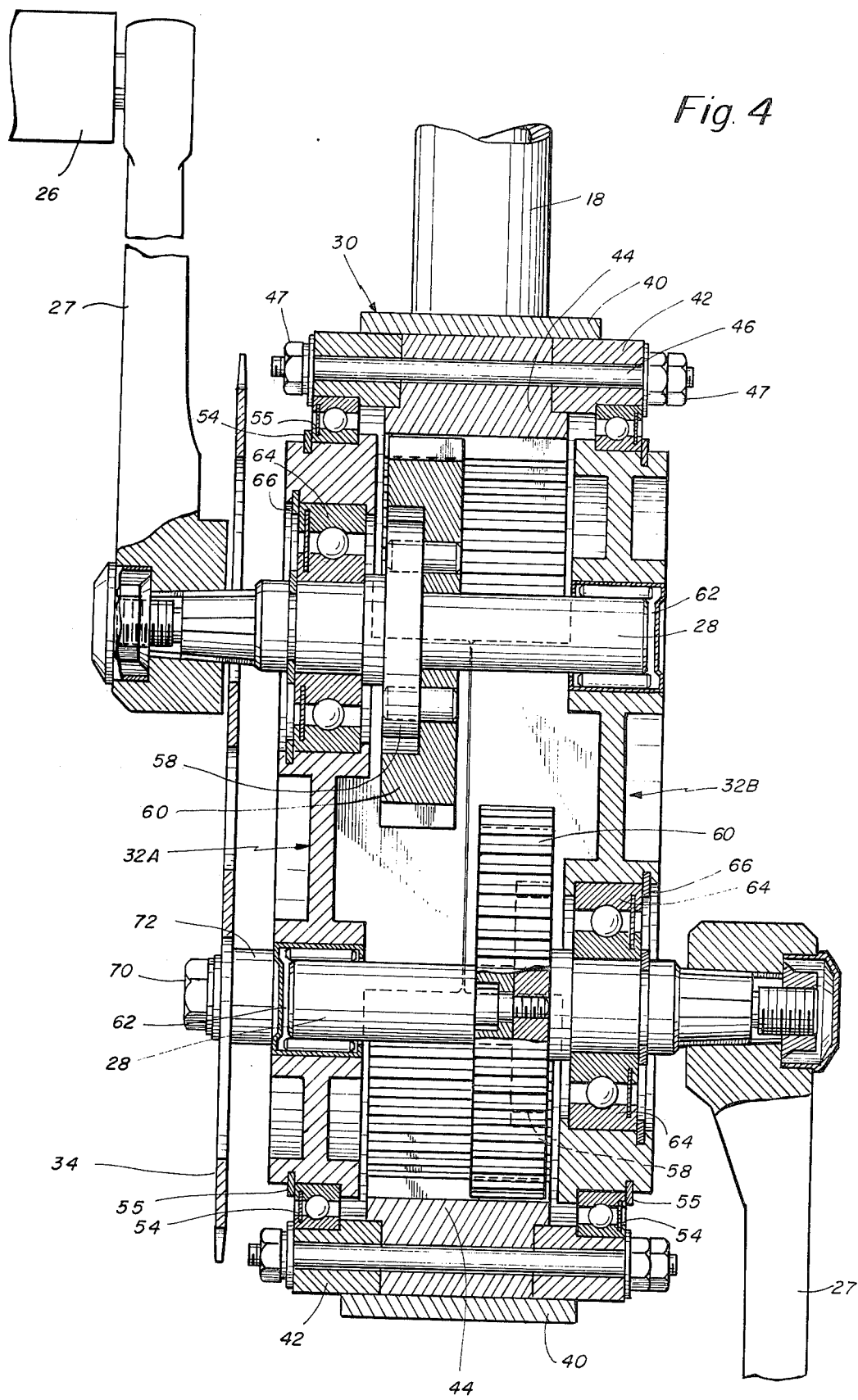
FIG. 4 is a cross-sectional view through the structure shown in FIG. 3 taken along line 4—4.

The details of the drive system of FIG. 1 are shown in FIGS. 3–5. However, FIG. 1 discloses the basic components which comprise pedals 26 and associated arms 27, pedal axles 28, fixed frame 30, rotating housing 32, and elliptical sprocket 34. In FIG. 1 the pedals 26 are shown as subscribing an elliptical path 36. The eccentricity of the elliptical part 36 is preferably chosen to be the same as the eccentricity of the elliptical sprocket 34. In FIG. 1 the pedals are depicted in the position wherein they extend along the major axis of the path 36. In this position it is noted that minor axis of the elliptical path of sprocket 34 coincides with the major axis of the path 36. Also, major axis of the path 36 is disposed at an angle B from the vertical.

With a standard bicycle there is a circular sprocket that has 52 teeth, each of 0.5 inch pitch. In accordance with the invention in one embodiment a circular sprocket may be used in association with the gear arrangement that provides the elliptical pedal path. However, it is preferred to employ an elliptical sprocket having its major axis perpendicular to the line of direction of the pedals in order to render the motion of the elliptical pedal path at a constant speed. The elliptical sprocket 34 preferably has 58 teeth, each of 0.5 inch pitch. 58 teeth are employed instead of the standard 52 because of the greater efficiency in applying the force due to the elliptical pedal path taught by this invention. If the 52 teeth were used then the pedals would be operated faster because of the increase in efficiency and the cyclist would no longer be turning the pedals at a comfortable rate.

In FIG. 1 the dimensions a and b represent one half of the major and minor axis, respectively, of the path 36 while the dimensions a' and b' represent one half of the major and minor axis, respectively, of the elliptical sprocket 34. The eccentricity e associated with the path 36 and the eccentricity e' associated with the sprocket 34 are chosen to be equal and may be 0.7714, for example.

Presently, a cyclist's feet travel in a circular motion. This circular pedal path has a radius R=6.75 inches for a standard bicycle. Therefore, the perimeter of the circular path is 42.4 inches. It is preferred that the cyclist's feet subscribe the pedal path having the same perimeter thereby making the path 36 in FIG. 1 of approximately 42" length. Having been given the eccentricity and the perimeter it is mathematically possible to determine the dimensions a and b. In the embodiment of FIG. 1 the dimension a=2.5 inches and the dimension b=5.25 inches.

Similarly, the dimensions a' and b' can also be determined using the same eccentricity of 0.7714. In the case of the sprocket 34 which employs 58 teeth, the perimeter may be approximated by the product of the number of teeth and the pitch. For 58 teeth with each a pitch of 0.5 inch, the perimeter is thus 29 inches. Mathematically, the dimensions a' and b' can then be solved and in the embodiment of FIG. 1 a'=5.576 inches and b'=3.549 inches.

FIG. 2 is a curve depicting the efficiency of the drive system of the present invention. FIG. 2 shows three curves A, B and C plotting a quarter cycle of rotation and the developed torque. The curve A represents a circular pedal motion in combination with a circular sprocket. Curve B represents an elliptical pedal motion in combination with a circular sprocket while curve C represents both an elliptical pedal motion and an elliptical sprocket. The energy that is produced in each case is represented by the area under each of the curves. Thus, it can be seen that the maximum output energy is attained with the curve C operation providing both elliptical pedal motion and the use of an elliptical sprocket.

The energy produced in case A which is represented by the area under the curve A can be shown mathematically to be represented by the following formula:

$$W_A = 6.75 \, F$$

where F equals the applied force. In the second case B the energy produced can be shown mathematically to be:

$$W_B = 8.25 \, F.$$

Finally, for the optimum output energy for case C represented by the area under the curve C of FIG. 2 the energy is:

$$W_C = 8.822 \, F.$$

Case B represents an increase of efficiency of approximately 22.2% while case C represents an increase in efficiency over case A on the order of 30.7%. However, to provide a realistic increase of efficiency, one should subtract losses due to friction of the two gears which are not provided on a standard bicycle and also subtract losses due to the increase in weight of the bicycle. These subtracted amounts are relatively small and it can be determined that the increase in efficiency in comparison to a standard bicycle is at least 25% for a cyclist applying a same effort at the same speed and for the same amount of time. Thus, under those conditions the energy transmitted to the back wheel is at least 25% greater which in turn means that the cyclist goes faster for the same amount of effort.

FIGS. 3–5 show the detail of the drive system depicted in FIG. 1. The frame means 30, as previously mentioned, is supported from the frame tubes 18 and comprises a tubular frame 40 and a pair of rings 42. The tubular frame 40 is secured to the tubular frame members 18 preferably by being welded thereto as shown. The rings 42 form an assembly with ring gear 44; the assembly is maintained together by means of the elongated threaded rods 46 having securing nuts 47 at the ends thereof. The rods 46 total eight and extend through accommodating passages in the ring gear 44 and the pair of rings 42. The assembly which comprises the rings 42 and the ring gear 44 is secured within the frame 40 by means of four hex head cap screws, each of which extend into a threaded aperture in the ring gear 44.

The rotatable housing means 32 comprises two housing halves 32A and 32B which are secured together by means of a pair of dowels 51 and bolts 52. Each of the housing halves is supported rotatably by means of a bearing 54 and associated retaining ring 55.

Both of the axles 28 are of like design and each include a flange 58 for securing the pinion gears 60 to their respective axles 28. These pinion gears 60 mesh with the ring gear but the two pinion gears themselves do not intermesh as clearly shown in FIG. 4; there being a space provided therebetween.

Each of the axles 28 is supported at ends in each of the housing halves 32A and 32B. Thus, for example, the upper axle 28 of FIG. 4 supported at one end in the housing 32B by means of the needle bearing 62. The lower axle 28 also has a similar supporting needle bearing 62. Each of the axles is also supported by means of a ball bearing 64 and associated retainer 66 so that the axles 28 are free to rotate in the housing halves 32A and 32B. The outer ends of both of the axles may be conventionally keyed to the pedal arms 27 so that the axles rotate upon rotation of the arms 27.

The sprocket 34 shown in FIGS. 3-5 has a gear track following an elliptical path with major and minor axis dimensions as discussed previously. The sprocket 34 is secured to the housing half 32A by means of four bolts 70 and associated spacers 72 which are used to space the sprocket from the housing preferably by on the order of 5/16 inch.

What is claimed is:

1. Bicycle sprocket drive apparatus mounted on a bicycle frame and for propelling the bicycle, said apparatus comprising;
   frame means secured to the bicycle frame, planetary gear means,
   housing means for mounting the planetary gear means,
   said planetary gear means including a pair of pinion gears each separately, rotatably mounted in the housing means and having axle means for the support thereof extending from opposite sides of said housing each for supporting pedal means,
   a sprocket having an elliptical gear path,
   whereupon rotation of said pedal means in turn causes rotation of said housing means and sprocket with said pedal means subscribing an elliptical path of rotation, and
   means securing the sprocket to said housing means with the minor axis of the elliptical sprocket substantially coinciding with the major axis of the elliptical pedal path.

2. Bicycle sprocket drive apparatus as set forth in claim 1 wherein said planetary gear means also includes an internally geared ring gear and means for fixedly securing the ring gear in the frame means, said housing means mounting the pinion gears to mesh with the ring gear on diametrically opposite sides thereof.

3. Bicycle sprocket drive apparatus as set forth in claim 2 including first bearing means for rotatably supporting the housing means in the frame means and second bearing means including bearings for supporting each axle means in the housing means.

4. Bicycle sprocket drive apparatus as set forth in claim 3 wherein said ring gear is circular and the diameter of each pinion gear is on the order of one half the diameter of the ring gear.

5. Bicycle sprocket drive apparatus as set forth in claim 4 wherein the pinion gears are spaced along the axis of the housing means so that the pinion gears are out of mesh with each other.

6. Bicycle sprocket drive apparatus as set forth in claim 1 wherein said pinion gears are spaced along the axis of the housing means so that the pinion gears are out of mesh with each other.

7. Bicycle sprocket drive apparatus as set forth in claim 1 wherein the small axis of the elliptical sprocket is displaced at least a small angular spacing from the vertical when the pedals are spaced their maximum distance.

8. Mechanical drive system comprising;
   a fixed frame means,
   at least one actuating member including an axle,
   planetary gear means including a ring gear fixed in the frame means and at least one pinion gear on said axle,
   housing means for supporting said actuating member and axle,
   first means for rotatably supporting said housing means in said frame means,
   second means for rotatably supporting said axle in said housing means with said pinion gear in mesh with said ring gear,
   driven means having an elliptical gear path, whereby upon rotation of said axle in turn causes rotation of said housing means and driven means with a free end of said actuating member circumscribing an elliptical path of rotation, and
   means securing said driven means to said housing means with the minor axis of the elliptical gear path substantially coinciding with the major axis of the elliptical actuating member path.

9. Bicycle sprocket apparatus as set forth in claim 1 including pedal arms for supporting the pedals wherein said minor axis of the sprocket coincides with the axes of the pedal arms.

* * * * *